United States Patent Office 3,539,523
Patented Nov. 10, 1970

3,539,523
ADHESIVE COMPOSITION
Michael Dunay, Fanwood, N.J., assignor to Celanese Corporation, New York, N.Y., a corporation of Delaware
No Drawing. Filed Aug. 2, 1967, Ser. No. 657,767
Int. Cl. C08f 45/44; C08g 51/44, 51/46
U.S. Cl. 260—32.6
4 Claims

ABSTRACT OF THE DISCLOSURE

An improved adhesive type composition of a solution of polybenzimidazole and boric acid and the process to produce the same.

FIELD OF THE INVENTION

This invention relates to an improved adhesive type composition which includes polymeric polybenzimidazole. More particularly, the invention is directed to an improved adhesive type composition comprising a solution of polybenzimidazole and boric acid as an additive and to the process of producing the composition.

DESCRIPTION OF THE PRIOR ART

Polymeric polybenzimidiazoles are known in the art to have outstanding stability at elevated temperatures. These polybenzimidazoles as described in U.S. Pats. 2,895,948; 3,174,947; and Re. 26,065 for fiber production and the casting of self-supporting films.

SUMMARY OF THE INVENTION

It has now been discovered that a solution of polymeric polybenzimidazole containing boric acid provides an adhesive type composition especially useful for laminates such as glass, plastics, metals and the like, which is exceptionally strong. Furthermore, the adhesive composition has a high degree of stability at elevated temperatures.

Polybenzimidiazoles are a known class of heterocyclic polymers. Typical of the type of polybenzimidazoles which can be utilized in this invention include:

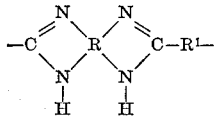

wherein R is an aromatic nucleus having each of the two depicted pairs of nitrogen atoms substituted upon adjacent carbon atoms of the said aromatic nucleus and R' is a carbocyclic aromatic or alicyclic ring, an alkylene group, or a heterocyclic ring. Examples of such heterocyclic rings include pyridine, pyrazine, furan, quinoline, thiophene and pyran. Preferred R groups are 3,3',4,4'-bisphenylene

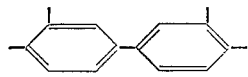

and 1,2,4,5-phenylene-

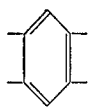

and

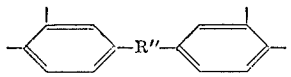

wherein R'' is—

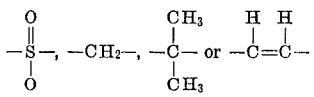

Examples of such polybenzimidazoles include poly-2,2-(pyridylene - 3'',5'')5,5'' - bibenzimidazole; poly - 2,2'-(furylene 2'',5'') - bibenzimidazole; poly - 2,2'-(naphthalene 1'',6''), -5,5'-bibenzimidazole; poly-2,2'-(biphenylene-4'',4''')-5,5'-bibenzimidazole; poly-2,2'-amylene-5,5'-bibenzimidazole, poly-2,2'-octamethylene-5,5'-di(benzimidazole) propane-2,2; poly-2,6-(p-phenylene)-diimidazobenzene; poly-2,2'-m-phenylene-5,5' - di(benzimidazole) ether and poly-2,2'-cyclohexenyl-5,5'-bibenzimidazole.

Another type of polybenzimidazole within the purview of the instant invention consists of recurring units of the formula:

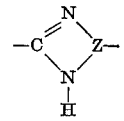

wherein Z is an aromatic nucleus having the two depicted nitrogen atoms substituted on adjacent carbon atoms of said aromatic nucleus. Exemplary of such polybenzimidazoles is poly-2,5(6)-benzimidazole.

The most important polybenzimidazole commercially is poly-2,2' - (m-phenylene)-5,5'-bibenzimidazole which consists of recurring units of the formula:

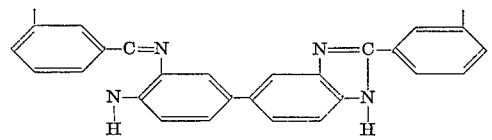

The polybenzimidazoles can be prepared according to the procedure as described in U.S. Pats. 2,895,948, 3,174,947 and Re. 26,065, to obtain the desired polymeric product. High molecular weight polybenzimidazoles can have an inherent viscosity in the range from about 0.3 to about 2.5 or higher. The inherent viscosity can be determined by the following equation:

$$\eta \text{ inh} = \frac{\eta \ln \text{rel}}{C}$$

the relative viscosity ($\eta$ rel) may be determined by dividing the flow time in a capillary viscometer of a dilute solution of the polymer by the flow time for the pure solvent. The concentration (C) is generally 0.2 gram of polymer per 100 ml. of solution. The measurements are made in sulfuric acid at 25° C.

The polymers used in this invention are soluble in relatively few solvents but are, however, soluble in formic acid and in concentrated sulfuric acid, producing stable solutions. Other solvents include dimethylsulfoxide, N-methylpyrrolidone, dimethylacetamide, and dimethylformamide, among others. The amount of solvent in the compositions can range from about 50 to about 95 weight percent, while the polymer content can range from about 5 to 50 weight percent.

The feature of the composition of this invention which provides remarkable adhesive properties is the addition of boric acid to the polymer solution in the range from about 0.25 weight percent to about 5.0 weight percent, preferably in the range from about 0.5 to about 2.0 percent. Any type of boric acid can be used, such as metaboric acid and orthoboric acid, on modifications thereof which produce the boric acid in situ.

The consistency of the composition of this invention is adjusted so that it can be evenly distributed over a substrate. A second substrate can be placed over the coating and cured at temperatures as high as 500° C., if desired, without detrimental effects to the composition. Outstanding adhesive quantities are obtained between substrates such as metals, e.g., stainless steel, aluminum, iron plates and the like, glass, ceramic, plastics, etc. and combinations of these substrates.

The following examples will serve to illustrate the compositions and process of this invention.

EXAMPLE 1

The addition of 1 weight percent boric acid into a film casting solution of 15 weight percent poly-2,2'-(m-phenylene)-5,5'-bibenzimidazole (inherent viscosity 0.8 in $H_2SO_4$ at 25° C.) in N,N'-dimethylacetamide causes the cast film to adhere to plate glass so strongly that the glass is ripped out of the plate surface after the film has been dried at 125° C. in vacuum (25 inches vacuum). Attaching a second plate glass to the uncured coating and curing will provide a glass laminate which cannot be separated in its separate components.

EXAMPLE 2

Utilizing the same casting solution of Example 1 on a Pyrex-type glass plate, removing solvent at 125° C. under vacuum and either baking the film in an oven at 310° C. for one hour or baking at 310° C., followed by 10 minutes at 475° C., will provide such remarkable film adhesion that removal of the Pyrex surface from the glass is not possible. Utilizing an aluminum plate in the same manner as the Pyrex surface above, improved adhesion is also obtained.

Utilizing a solution of polybenzimidazole in N,N'-dimethylacetamide without the boric acid does not provide adhesion of the cured film to the same degree in that the film can be removed from the plate and aluminum surface.

It is to be understood that the foregoing description is merely illustrative and preferred embodiments of the invention of which many variations may be made by those skilled in the art within the scope of the following claims without departing from the spirit thereof.

The embodiments of the invention in which an exclusive property or privilege is claimed are defined as follows:

1. An improved adhesive type composition, comprising: a solution of from about 0.25 to about 5 weight percent boric acid and from about 5 to about 50 weight percent polybenzimidazole polymer possessing an inherent viscosity of from about 0.3 to about 2.5.

2. The composition of claim 1 wherein the solvent is N,N'-dimethylacetamide.

3. The composition of claim 2 wherein the polybenzimidazole is poly-2,2' - (m-phenylene)-5,5'-bibenzimidazole.

4. The cured composition of claim 3.

References Cited

UNITED STATES PATENTS

| | | | |
|---|---|---|---|
| 2,895,948 | 7/1959 | Brinker et al. | 260—78.4 |
| 3,313,783 | 4/1967 | Iwakura et al. | 260—78 |
| 3,386,969 | 6/1968 | Levine | 260—78.4 |

MORRIS LIEBMAN, Primary Examiner

R. ZAITLEN, Assistant Examiner

U.S. Cl. X.R.

260—30.4, 30.8, 32.6, 787